(12) United States Patent
Miyazaki et al.

(10) Patent No.: US 6,897,631 B2
(45) Date of Patent: May 24, 2005

(54) LEGGED ROBOT

(75) Inventors: Susumu Miyazaki, Wako (JP); Hideaki Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/416,851

(22) PCT Filed: Nov. 16, 2001

(86) PCT No.: PCT/JP01/10027

§ 371 (c)(1),
(2), (4) Date: May 16, 2003

(87) PCT Pub. No.: WO02/40225

PCT Pub. Date: May 23, 2002

(65) Prior Publication Data

US 2004/0032233 A1 Feb. 19, 2004

(30) Foreign Application Priority Data

Nov. 17, 2000 (JP) .................................. 2000-352012

(51) Int. Cl.$^7$ ................................................ B25J 5/00
(52) U.S. Cl. ............. 318/568.12; 318/567; 318/568.13; 700/245; 700/253; 180/8.6
(58) Field of Search ............................. 318/568; 901/1, 901/33; 180/8.6; 700/245, 253; 73/862.08; 701/23

(56) References Cited

U.S. PATENT DOCUMENTS

| | | | | |
|---|---|---|---|---|
| 5,151,859 A | * | 9/1992 | Yoshino et al. ............... 701/23 |
| 5,157,316 A | * | 10/1992 | Glovier .................. 318/568.11 |
| 5,159,988 A | * | 11/1992 | Gomi et al. .................. 180/8.6 |
| 5,318,471 A | * | 6/1994 | Glovier ....................... 446/268 |
| 5,343,397 A | * | 8/1994 | Yoshino et al. ................ 701/23 |
| 5,808,433 A | * | 9/1998 | Tagami et al. ......... 318/568.12 |
| 5,872,893 A | * | 2/1999 | Takenaka et al. ........... 700/245 |
| 6,021,363 A | * | 2/2000 | Nishikawa et al. ......... 700/253 |
| 6,220,104 B1 | * | 4/2001 | Yoshino et al. .......... 73/862.08 |
| 6,243,623 B1 | * | 6/2001 | Takenaka et al. ........... 700/245 |
| 6,266,576 B1 | * | 7/2001 | Okada et al. ............... 700/245 |
| 6,301,524 B1 | * | 10/2001 | Takenaka ..................... 700/245 |
| 6,583,595 B1 | * | 6/2003 | Hattori et al. ............... 318/567 |

FOREIGN PATENT DOCUMENTS

| | | |
|---|---|---|
| JP | 7-205069 | 8/1995 |
| WO | WO 00/147372 | 8/2000 |

* cited by examiner

*Primary Examiner*—Paul Ip
(74) *Attorney, Agent, or Firm*—Squire, Sanders & Dempsey L.L.P.

(57) ABSTRACT

A legged robot, wherein an electric motor 88 for driving a joint 10R connecting a body and each leg 2R is disposed on the leg side and is disposed with an offset from the rotation axis of the joint. Further, a motor attachment member 86 for housing the electric motor 88 is perforated with an opening part at a location facing the body. By this, attachment/detachment of the leg of the robot is made easy to improve its ease of maintenance. Further, the power transmission means for transmitting drive force from the drive source to the joint connecting the body and the leg can be readily accessed. In addition, the leg can be rotated to a desired angle to facilitate swing operation and the like.

5 Claims, 12 Drawing Sheets

LEGGED ROBOT

TECHNICAL FIELD

The present invention relates to a legged robot, more particularly to a biped legged robot that enables ready attachment and detachment between legs and a body.

BACKGROUND ART

Various technologies have been proposed with regard to legged robots, including, for example, that taught by Japanese Laid-Open Patent Application No. 3-184782.

In Japanese Laid-Open Patent Application No. 3-184782, in order to reduce the inertial mass of a leg (leg linkage), the drive source (motor) for driving the joint connecting the body and the leg installed on a pelvic plate that is one part of the body of the robot. In the interest of high reduction ratio and to increase space utilization efficiency in a legged robot, a speed reducer having a high reduction gear ratio and coaxial input and output, such as a Harmonic Drive (harmonic speed reducer; trade name), is ordinarily used to reduce the speed of the output (rotation) of the drive source and transmit it to the joint.

In the aforesaid technology, removal of a leg requires that the speed reducer at the pelvic plate be disassembled into its constituent elements (flexspline and circular spline in the case of a Harmonic Drive), and during reassembly the procedure has to be conducted in reverse, which is troublesome.

In particular, ease of maintenance is not necessarily satisfactory because the flexspline is inserted into the circular spline with their gears meshed, so that disassembly is relatively easy but assembly must be conducted by engaging the gears. In addition, the pelvic plate must also be removed from the body of the robot when adjusting the tension of the belt that transmits the drive force from the drive source to the speed reducer, which is troublesome.

DISCLOSURE OF THE INVENTION

An object of the present invention is therefore to overcome the aforesaid inconveniences by providing a legged robot in which legged robot the attachment/detachment of legs is made easy to improve maintenance ease.

A second object of the present invention is to provide a legged robot wherein a power transmission means for transmitting drive force from a drive source that drives a joint connecting the body and a leg can be easily accessed to enable adjustment thereof when required.

A third object of the present invention is to provide a legged robot that prevents interference during relative displacement of the legs, thereby expanding the degree of freedom in gait design.

In order to solve the aforesaid objects, as recited in claim 1, there is provided a legged robot having at least a body and a plurality of legs each connected rotatably to the body through a joint, characterized in that: a drive sources for driving the joint is disposed on each leg.

Since the drive source for driving the joint connecting the body and the leg is disposed on the leg side, the leg can be easily attached/detached to/from the robot body to improve the ease of maintenance of the legs of the legged robot.

As recited in claim 2, the drive source is disposed with an offset from a rotation axis of the joint and is connected to the joint through power transmission means.

The drive source for driving the joint connecting the body and leg is offset from the rotation axis of the joint; more specifically, the input shaft of the speed reducer (i.e., the rotation shaft of the joint) is constituted as a parallel shaft spaced apart from the output shaft of the drive source (electric motor) and the drive source is disposed at the rear of the outer side of the leg relative to the direction of robot advance. Further, the drive source and the joint are connected through power transmission means, i.e., a belt.

Owing to this structure, the same advantages and effect as those of claim 1 are manifested, the leg can be rotated to a desired angle, and swing operation and the like are made easy, thereby expanding the degree of freedom in gait design.

As recited in claim 3, the drive source is covered with a case and the case is perforated with an opening at a location where the case faces the body.

The drive source is covered with a case, and an opening, more specifically an insertion hole for a screwdriver or other such adjustment tool, is perforated at a location of the case facing the body, more specifically near the upper end of the leg, whereby the belt or other transmission means for driving the joint connecting the body and the leg can be easily accessed by the operator and, likewise, ease of maintenance can be improved.

As recited in claim 4, there is provided a biped robot having at least a body and two legs each connected rotatably to the body through a joint, characterized in that: a drive source for driving the joint is disposed at an outer side of each leg with an offset from a rotation axis of the joint, thereby preventing interference during relative displacement of the two legs.

The biped robot is configured to offset the drive source for driving the joint from the rotation axis of the joint to dispose it at the outer side of the legs, i.e., to dispose the drive source installed in the two legs at the right side of the right leg and the left side of the left leg relative to the direction of robot advance, more specifically to dispose it at the rear side of the left and right sides, thereby preventing interference during relative displacement of the two legs, and therefore, the legs can be rotated to desired angles, and swing operation and the like are made easy to expand the degree of freedom in gait design.

BEST MODE OF CARRYING OUT THE INVENTION

A legged robot according to an embodiment of the present invention will be explained with reference to the attached drawings in the following.

Figure 1:
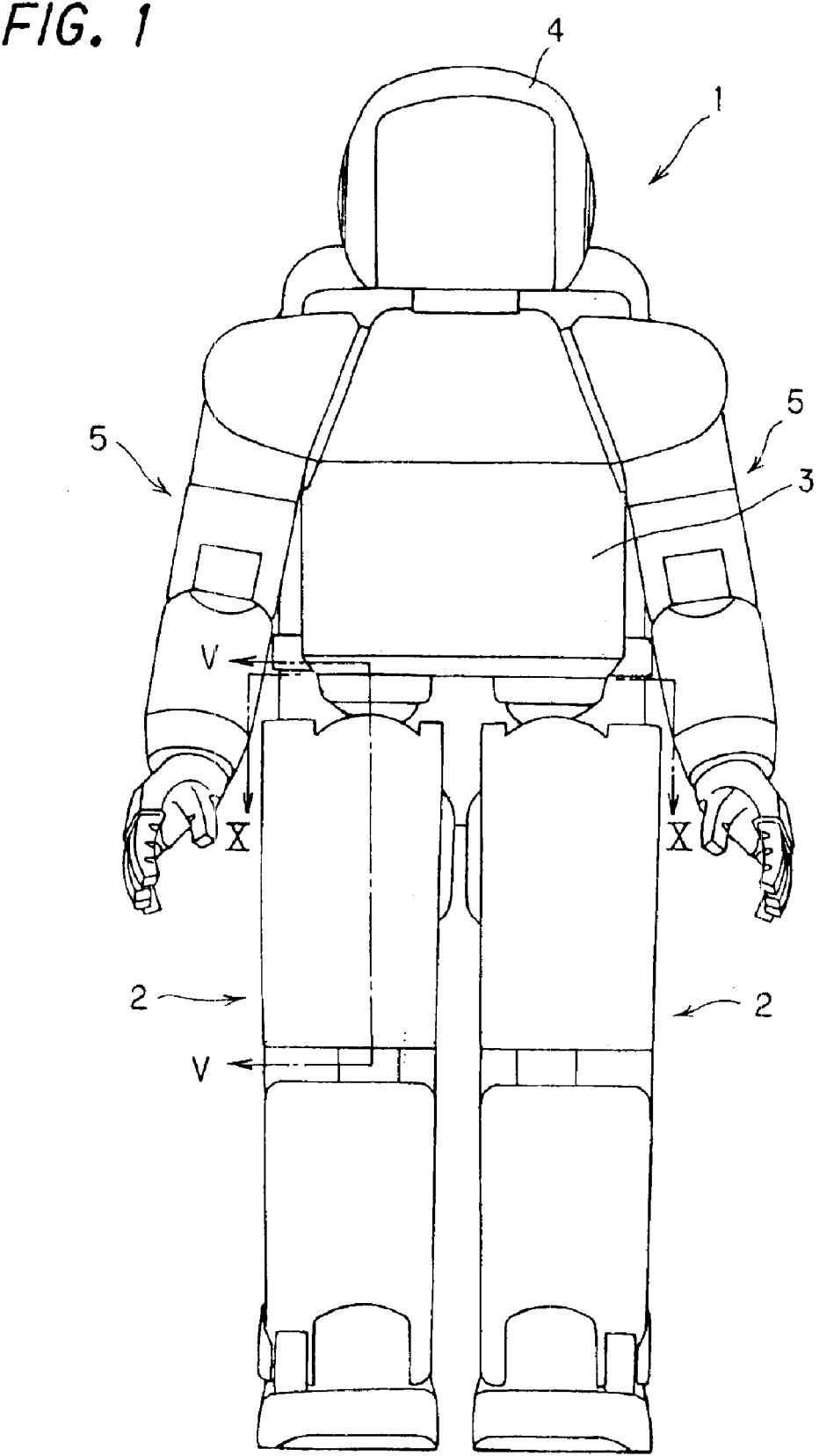
FIG. 1 is a front view of a legged robot according to an embodiment of the present invention.
Figure 2:
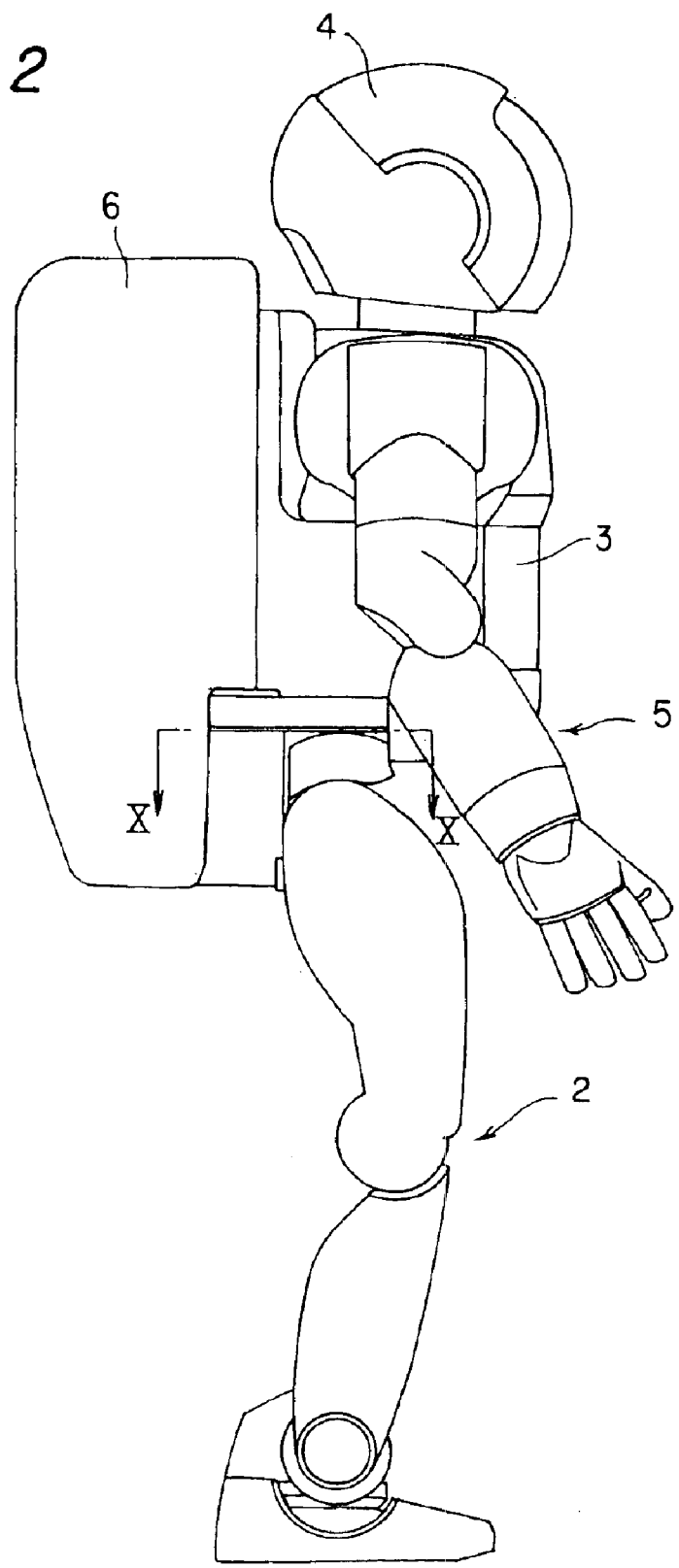
FIG. 2 is a right side view of the legged robot shown in FIG. 1.

FIG. 1 is a front view of a legged robot (hereinafter called "robot") 1 according to an embodiment of the present invention, and FIG. 2 is a side view thereof. A biped robot is taken as an example of a legged robot.

As shown in FIG. 1, the robot 1 is equipped with two legs (leg linkages) 2, above which is provided a body (upper body) 3. A head 4 is provided at the upper part of the body 3 and two arm linkages 5 are connected to opposite sides of the body 3. Further, as shown in FIG. 2, a housing unit 6 is provided on a back part of the body 3, inside which are accommodated, among others, a control unit (explained later) and a battery power supply (not shown) for electric motors (drive sources; explained later) for driving joints of the robot 1. The robot 1 shown in FIGS. 1 and 2 is one shown attached with covers for protecting its internal structure.

The internal structure of the aforesaid robot 1 will now be explained with reference to FIG. 3, focusing chiefly on the joints.

As illustrated, the right and left legs 2 of the robot 1 are each equipped with six joints.

The twelve joints comprise joints 10R, 10L (R and L indicating the right and left sides; hereinafter the same) around the hip vertical axis (Z axis or gravity axis) for leg swiveling, roll direction (around X axis) joints 12R, 12L of hips (crotch), pitch direction (around Y axis) joints 14R, 14L of the hips (crotch), pitch direction (around Y axis) joints 16R, 16L of knees, pitch direction (around Y axis) joints 18R, 18L of ankles, and roll direction (around X axis) joints 20R, 20L of the ankles. Feet (foot parts) 22R, 22L are attached at lower parts of the leg linkages 2R(L).

Thus each leg 2 comprises the hip joints (crotch joints) 10R(L), 12R(L) and 14R(L), knee joint 16R(L) and ankle joints 18R(L) and 20R(L). The hip joints and knee joint are connected by a thigh link 24R(L) and the knee joint and ankle joints by a crus link 26R(L).

Figure 3:
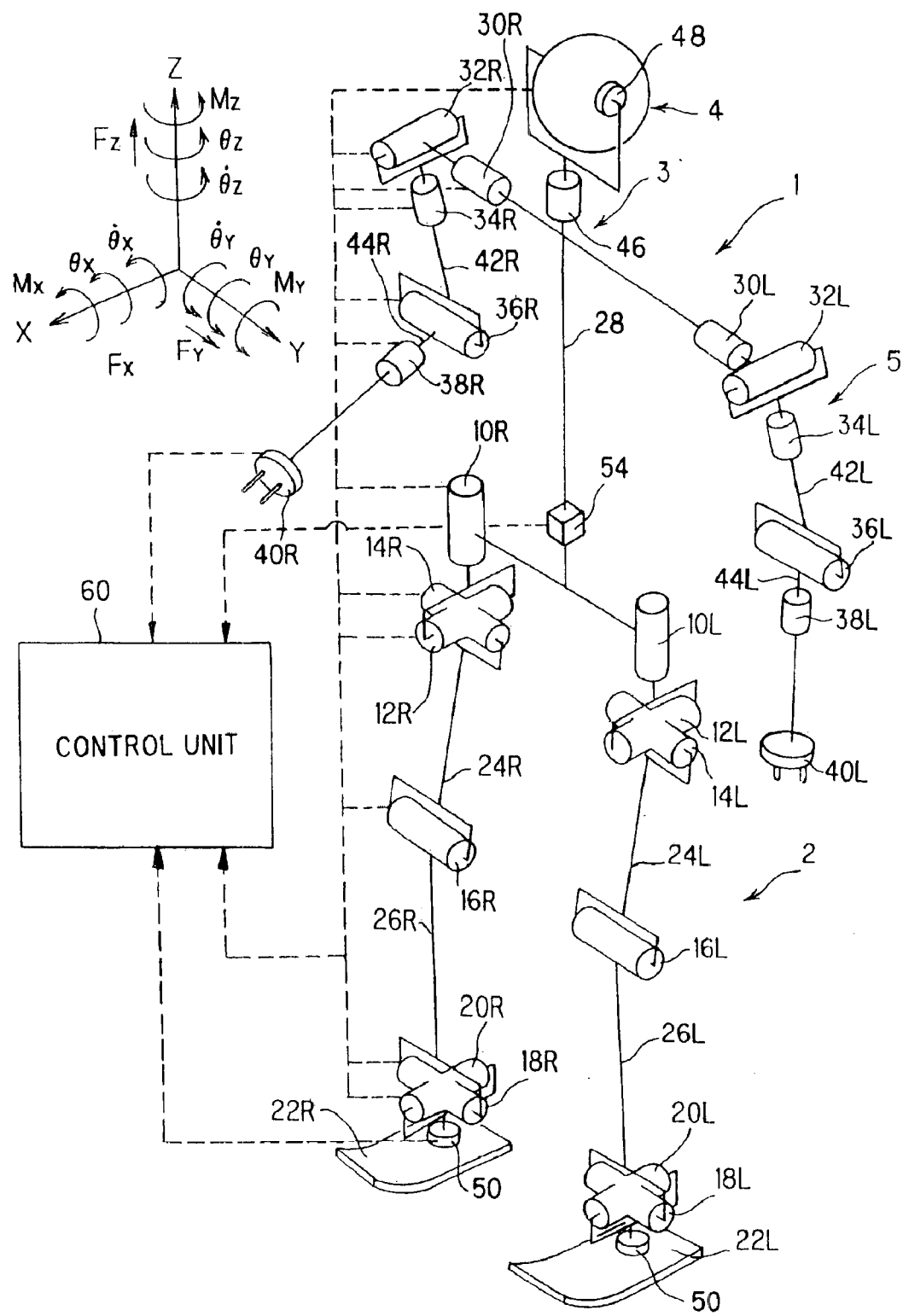
FIG. 3 is a schematic diagram showing the overall internal structure of the legged robot of FIG. 1 with focus on the joints.

The legs (leg linkages) 2 are connected through the hip joints to the body 3, which is represented in FIG. 3 simply by a body link 28. The arm linkages 5 are connected to the body 3, as set out above.

The arm linkages 5 comprise pitch direction joints 30R, 30L of shoulders, roll direction joints 32R, 32L of the shoulders, joints 34R, 34L around the vertical axis for arm swiveling, joints 36R, 36L around the pitch axis of elbow parts, and joints 38R, 38L around the vertical axis for wrist swiveling. Hands (end effectors) 40R, 40L are attached to the distal ends of the wrists.

Thus each arm linkage 5 comprises the shoulder joints 30R(L), 32R(L), 34R(L), the elbow joint 36R(L) and the wrist joint 38R(L). Further, the shoulder joints and the elbow joint are connected by an upper arm link 42R(L) and the elbow joint and the hand by a forearm link 44R(L).

The head 4 comprises a neck joint 46 around a vertical axis and a head rotation (nod) mechanism 48 for rotating the head 4 at an axis perpendicular thereto. A visual sensor (not shown) comprising a CCD camera or the like is housed inside the head 4 as an external sensor.

Owing to the foregoing configuration, the legs 2 are imparted with a total of twelve degrees of freedom with respect to the left and right legs, so that during locomotion the legs as a whole can be imparted with desired movements by driving the twelve joints to appropriate angles to enable desired walking in three-dimensional space. Further, the arm linkages 5 are each given five degrees of freedom with respect to the left and right arms, so that desired operations can be carried out by driving these joints to appropriate angles.

A conventional six-axis force sensor 50 is attached to the foot member 22R(L) below the ankle joint and, of the external forces acting on the robot, detects the floor reaction force components Fx, Fy and Fz of three directions and the moment components Mx, My and Mz of three directions acting on the robot from the surface of contact.

An inclination sensor 54 is mounted on the body 3 to detect inclination relative to the vertical axis and the angular velocity thereof. Further, the electric motors of the respective joints relatively displace the links 24, 26R(L) etc. through reducers (explained later) that reduce the speed and increase the torque of their outputs, and rotary encoders (omitted in FIG. 3) are provided to detect the amount of rotation thereof.

As mentioned above, a control unit 60 comprising a microcomputer is, together with other components, housed inside the housing unit 6, and the outputs of the six-axis force sensor 50 etc. (for simplicity of illustration, only those from the right side of the robot 1 are shown) are sent to the control unit 60).

Figure 4:
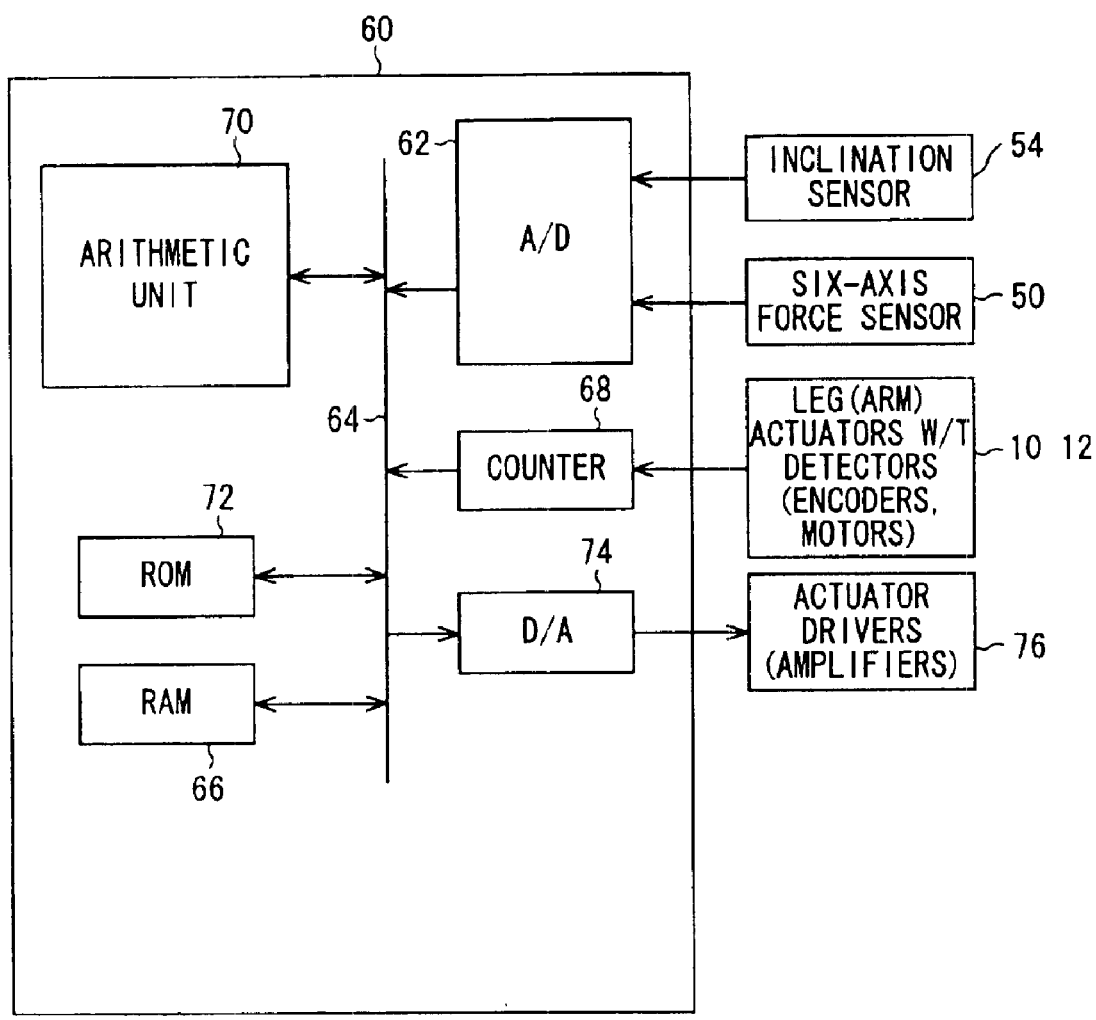
FIG. 4 is a block diagram showing details of a control unit shown in FIG. 3.

FIG. 4 is a block diagram showing the configuration of the control unit 60 in detail.

As illustrated, the control unit 60 comprises a microcomputer. Here the outputs from the inclination sensor 54 etc. are converted into digital signals by an A/D converter (indicated as "A/D" in the drawing) 62 and the output thereof is sent via a bus 64 to a RAM 66. Further, the outputs of encoders disposed adjacent to the electric motors at the respective joints are input to the RAM 66 through a counter 68.

An arithmetic unit 70 composed of a CPU is provided in the control unit 60; and based on data stored in a ROM 72 and the sensor outputs, the arithmetic unit 70 computes the control values (control inputs) needed for driving the joints and outputs them to the motors for driving the joints through a D/A converter (indicated as "D/A" in the drawing) 74 and actuator drivers (amplifiers) 76 provided at the individual joints.

What characterizes the robot 1 of this embodiment is that in a robot equipped with a plurality of, more specifically, two legs 2R(L) each connected rotatably to the body 3 through respective joints 10R(L) around hip vertical axes for leg swiveling at the hip joints, the robot is configured to enable ready attachment/detachment of the legs 2R(L) from the body 3 by situating the drive sources (electric motors; explained later) for driving the joints 10R(L) on the side of the legs 2R(L).

Figure 5:
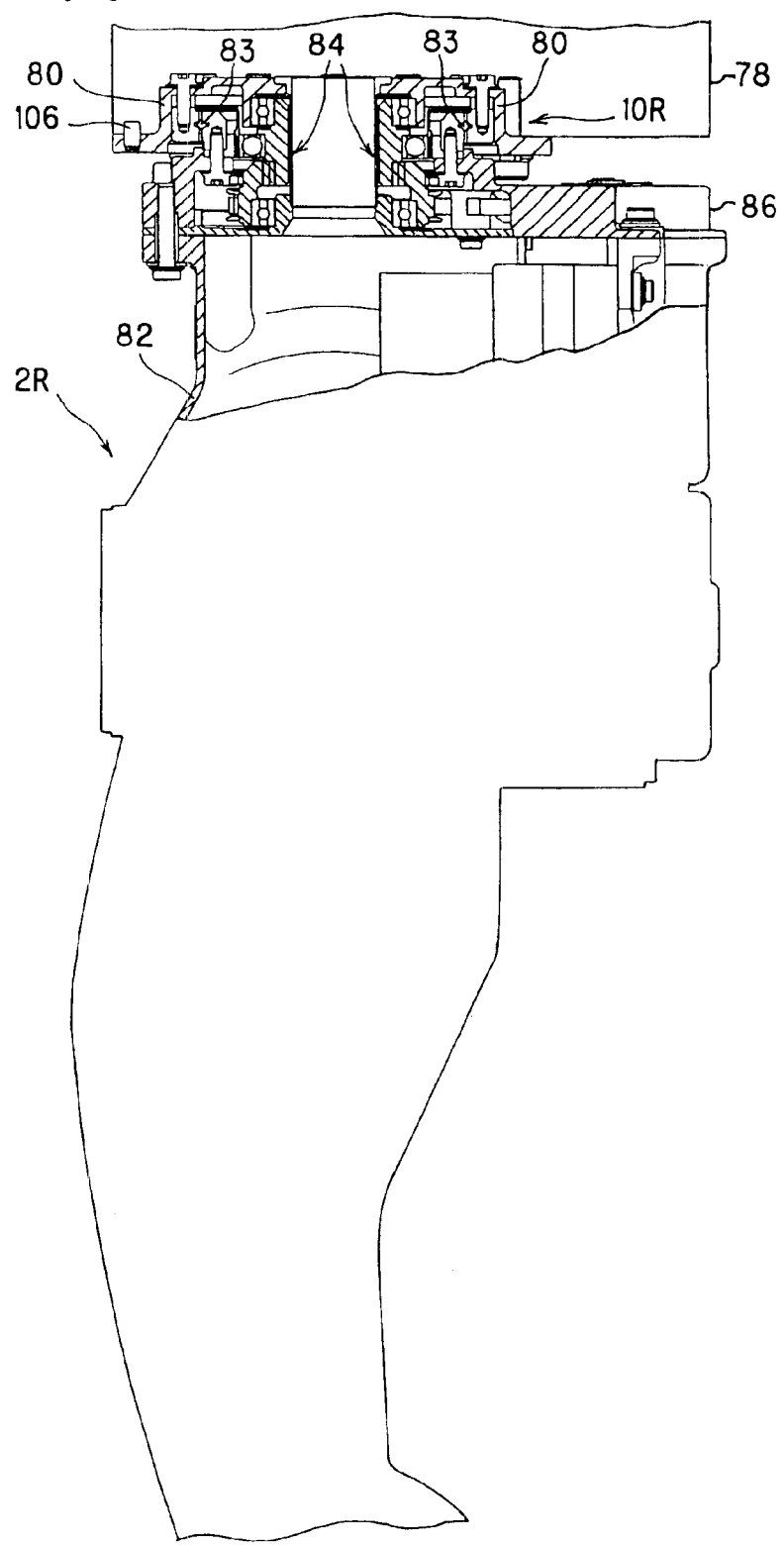
FIG. 5 is a partial sectional view taken along line V—V in FIG. 1.
Figure 6:
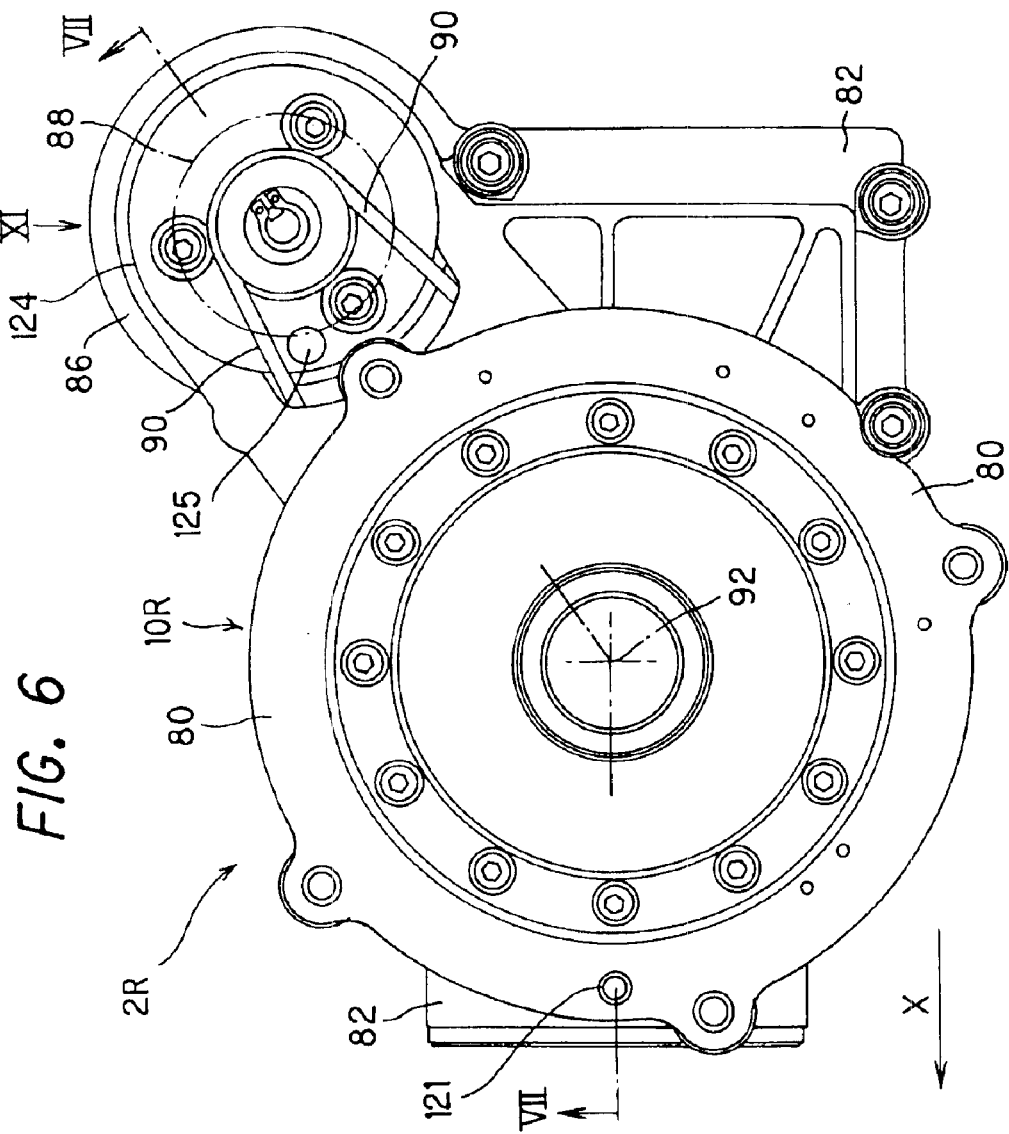
FIG. 6 is a top view seen from above the right-side leg after removal of the body.
Figure 7:
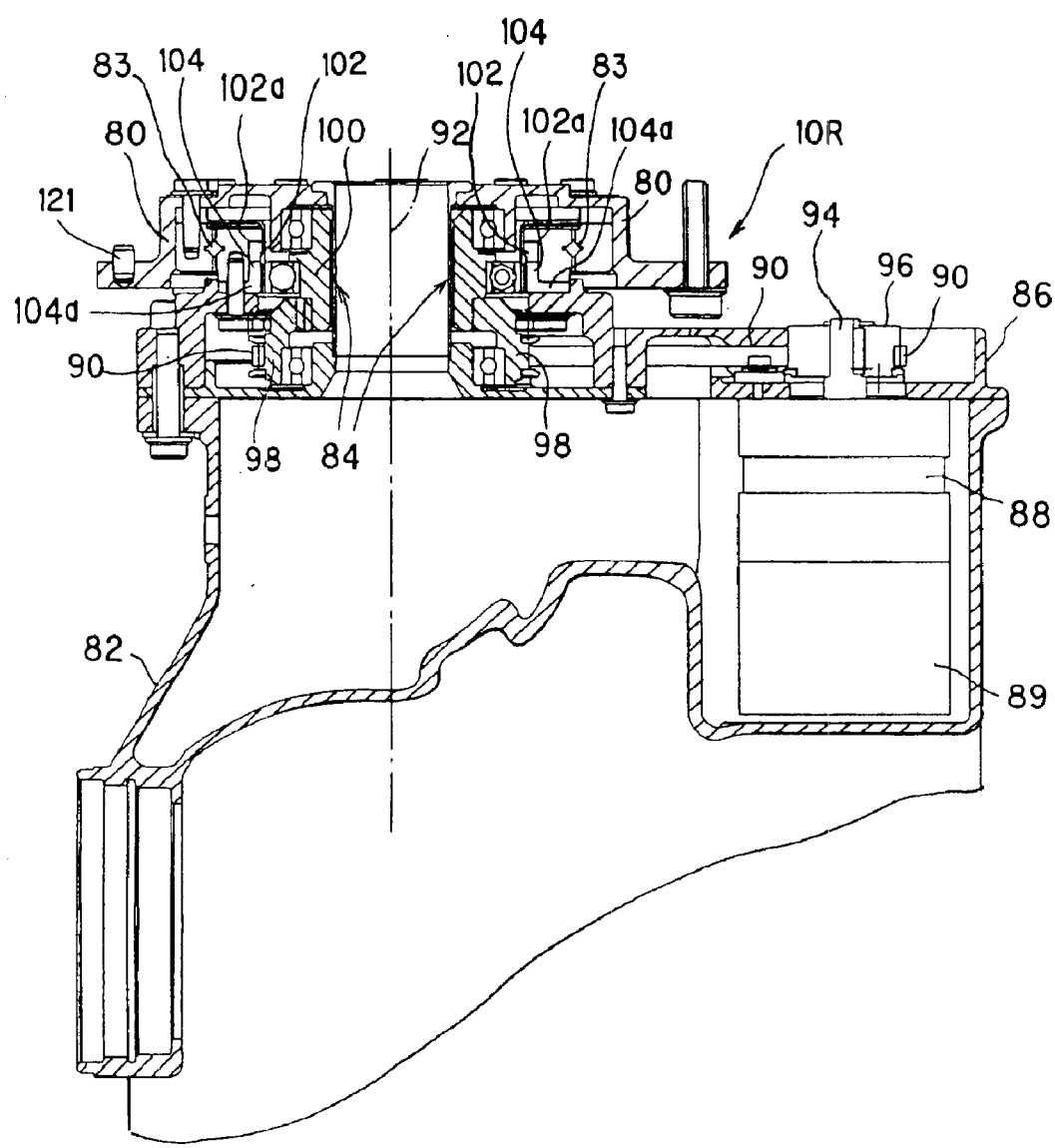
FIG. 7 is a sectional view taken along line VII—VII in FIG. 6.

In the following, the structure of the joint 10R will be explained with reference to FIGS. 5 to 7 showing the right-side leg 2R.

FIG. 5 is sectional view along V—V in FIG. 1, namely a partial sectional view of the leg 2R of the robot 1; FIG. 6 is top view seen from above the leg 2R after removal of the body 3; and FIG. 7 is an explanatory sectional view taken along line VII—VII in FIG. 6. In order to simplify the explanation only the vicinity of the joint 10R is illustrated in FIGS. 6 and 7.

As shown in FIGS. 5 and 6, the joint 10R around the hip vertical axis for leg swiveling is installed near the upper end of the leg 2R. The joint 10R is equipped with a body fastening part 80 intended for fastening to the body 3 and perforated with bolt holes (explained later), and with a frame member 82 connecting the joint 10R and joint 12R.

The body fastening part 80 and member 82 are connected through a roller bearing 83 to be capable of relative rotation, and the drive force of the relative rotation is imparted from a speed reducer, specifically a Harmonic Drive 84. A motor attachment member (case) 86 is provided unitarily with the member 82 and a drive source, specifically an electric motor 88 (indicated by a phantom line in FIG. 6) is housed therein. The amount of rotation of the electric motor 88 is detected by a rotary encoder 89, and the drive force thereof is transmitted to the Harmonic Drive 84 through a belt (power transmission means) 90.

The structure of the joint 10R will next be explained in detail with reference to FIG. 7.

A pulley (power transmission means) 96 is fastened to an output shaft 94 of the electric motor 88 housed at an appropriate location in the motor attachment member 86, and the belt 90 is wrapped about the pulley 96 at an appropriate tension. The other end of the belt 90 wrapped about an input shaft side pulley (power transmission means) 98 of the Harmonic Drive 84. The pulley 98 is fastened to a wave generator 100 so as to rotate coaxially therewith. The drive force of the electric motor 88 is therefore transmitted to the Harmonic Drive 84 through the belt 90.

The wave generator 100 is inserted into a flexspline 102 and an output part 102a of the flexspline 102 is fastened to the body fastening part 80 side, while an output part 104a of a circular spline 104 is fastened to the member 82 side. The flexspline 102 is inserted into the circular spline 104 with their gears meshed.

In the joint 10R, when the drive force output from the electric motor 88 is inputted to the Harmonic Drive through the belt 90, relative movement arises between the flexspline 102 (i.e., the body fastening part 80) and the circular spline 104 (i.e., the member 82) in the well-known manner.

To give a more concrete explanation taking as an example the case where a view is taken from above as in FIG. 6, when the electric motor 88 is driven clockwise, the drive force is transmitted trough the pulley 96, belt 90 and pulley 98 to drive the wave generator 100 clockwise. When the flexspline 102 is driven counterclockwise and the circular spline clockwise, the body fastening part 80 and the member 82 to which their output parts 102a, 104a are fastened are driven counterclockwise and clockwise to produce relative rotational movement, whereby the leg 2R is rotated clockwise relative to the body 3.

Explanation of the structures of the joints other than the joint 10R of the leg 2R, such as the joints 12, 14 etc., is omitted and these joints are also omitted from FIG. 5 and other drawings, because they are approximately the same as those set out in Japanese Laid-Open Patent Application No. 3-184782. In addition, explanation of the left-side leg 2L is omitted because the legs 2R(L) are laterally symmetrical.

Attachment/detachment of the legs 2R(L) to/from the body 3 by the operator will next be explained with reference to FIGS. 8 and 9.

Figure 8:
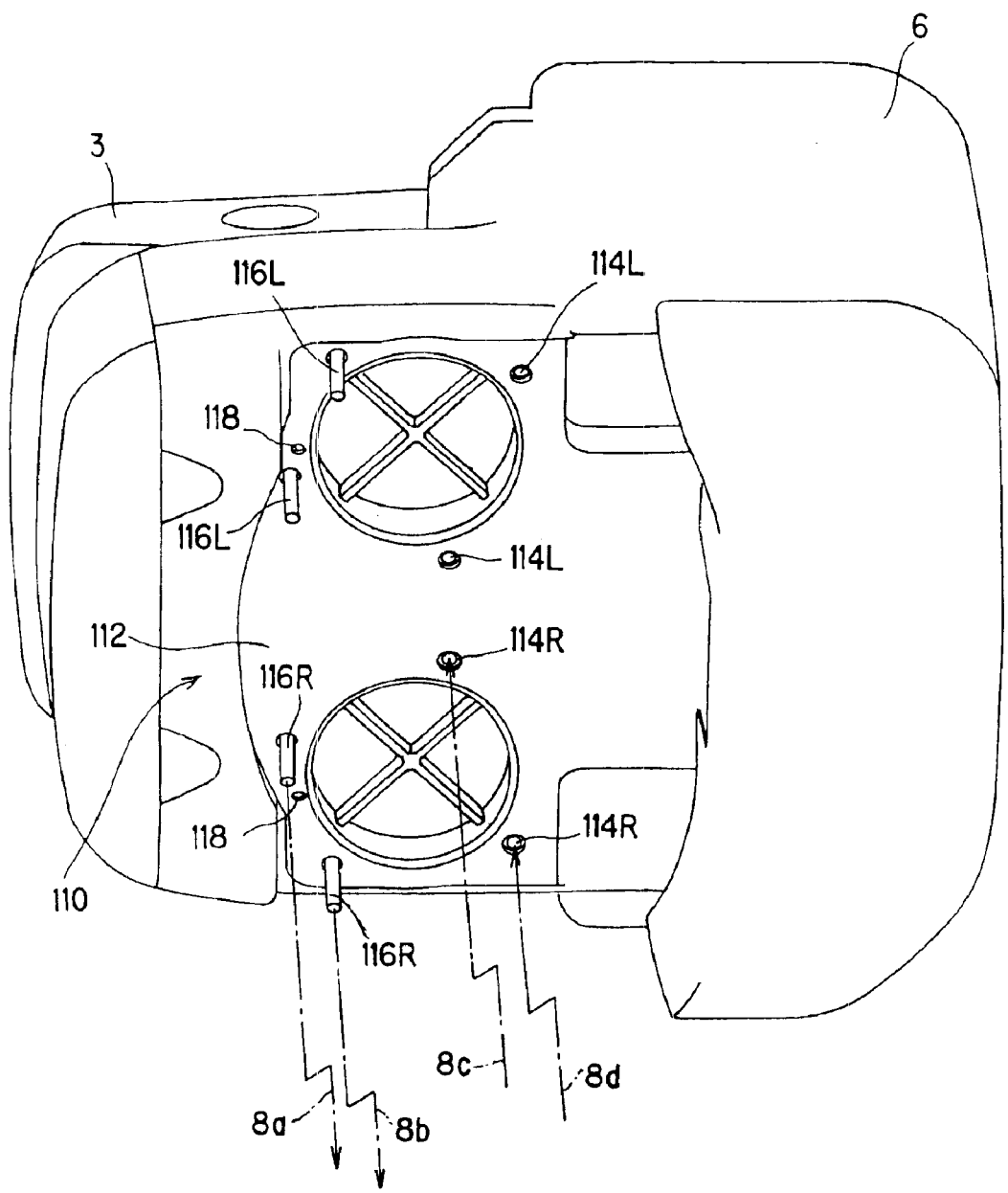
FIG. 8 is a bottom perspective view seen from diagonally below the body of the legged robot shown in FIG. 1 and other figures.
Figure 9:
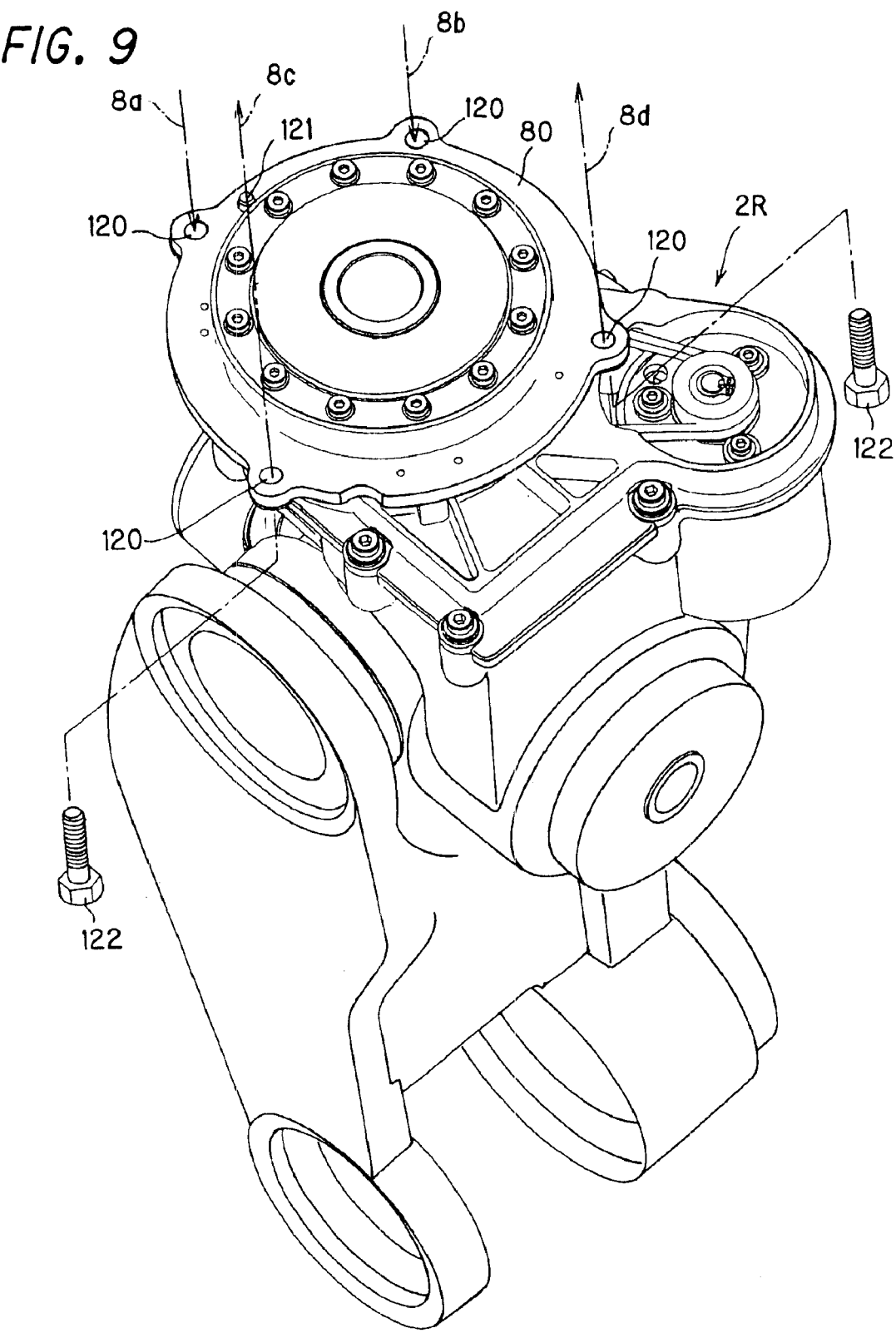
FIG. 9 is a top perspective view seen from diagonally above the right-side leg of the robot shown in FIG. 6.

FIG. 8 is a bottom perspective view seen from diagonally below the body 3 and FIG. 9 is a top perspective view seen from diagonally above the leg 2R. To simplify the explanation, illustration of the head 4 and the arm linkages 5R(L) is omitted from FIG. 8 and the ensuing figures when the body 3 is shown.

As shown in FIG. 8, a leg attachment surface 112 of a pelvic plate 110 on the bottom side of the body 3 is perforated with bolt holes 114R(L) for bolting on the leg 2R(L) and stud bolts 116R(L) are formed to project therefrom. Positioning holes 118 are perforated at appropriate locations of the leg attachment surface 112.

As shown in FIG. 9, bolt holes 120 for fastening the leg 2R to the body are perforated in the body fastening part 80 of the leg 2R(L) at locations corresponding to the bolt holes 114R(L) and stud bolts 116R(L). Further, projecting parts 121 are provided in the upper surface of the body fastening part 80 (the surface facing the leg attachment surface 112) at locations corresponding to the positioning holes 118.

To explain the procedure for attaching the leg 2R to the body 3, first the stud bolts 116R on the body 3 side are inserted into the bolt holes 120 along the broken lines 8a and 8b shown in FIGS. 8 and 9 and the projecting parts 121 are inserted into the positioning holes 118 to complete positioning, and then nuts (not shown) are tightened on the stud bolts 116R from under the body fastening part 80. Next, bolts 122 are passed from under the body fastening part 80 along the broken lines 8c and 8d and through the bolt holes 120 and are then inserted into the bolt holes 114R and fastened. The attachment of the leg 2 to the body 3 is completed in this manner.

As set out earlier, when the leg is attached to the pelvic plate in the prior art legged robot, since the drive source is disposed on the pelvic plate, the flexspline and circular spline have to be assembled while meshing their gears, making this work troublesome, but in the robot 1 of the present invention, since the electric motor 88 is disposed on the leg 2R(L) side, the constituent elements of the Harmonic Drive 84 need not be disassembled when the leg 2R(L) is detached from the body 3 of the robot 1, and, therefore, since attachment of the leg 2R(L) requires only bolting, ease of maintenance can be enhanced.

As there is no need to consider positioning and the like when the leg 2R is removed from the body 3, it suffices merely to remove the nuts tightened on the stud bolts 116R and the bolts 122.

Returning to the explanation of FIG. 6, the electric motor 88 is disposed with an offset from the rotation axis 92 of the joint 10R. More specifically, the output shaft (axis) of the electric motor 88 and the input axis of the Harmonic Drive 84 (i.e., the rotation axis 92 of the joint) are constituted as spaced-apart parallel shafts, and the electric motor 88 is disposed at the rear of the outer side of the leg relative to the direction of advance of the robot 1. Further, the electric motor 88 is disposed at the rear of the right outer side of the leg 2R with respect to the direction of advance of the robot 1 (X-axis direction) and is connected to the joint 10R through the belt 90.

Next, the swing or turning operation of the robot 1 will be explained with reference to FIGS. 6 and 10(a) and (b).

Figure 10A:
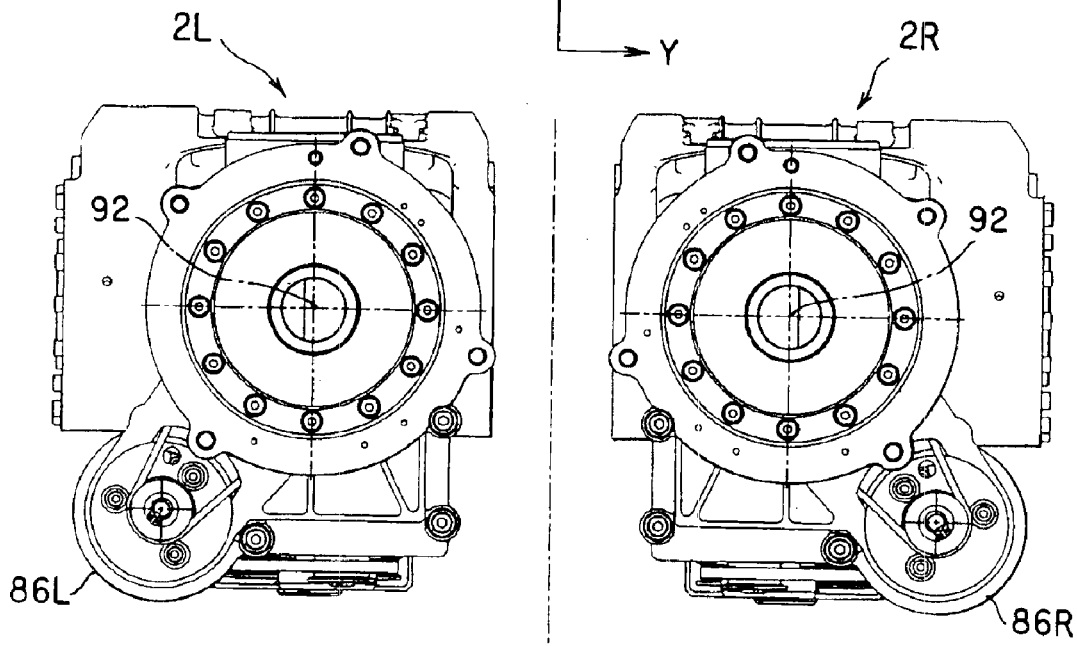
FIG. 10 is a set of sectional views taken along lines X—X in FIGS. 1 and 2.

FIGS. 10(a) and (b) are sectional views of the legs 2R(L) taken along lines X—X in FIGS. 1 and 2. To put the focus of the drawing on the joints 10R(L), only the vicinities thereof are shown and illustration of the feet 22R(L) etc. is omitted.

Figure 10B:
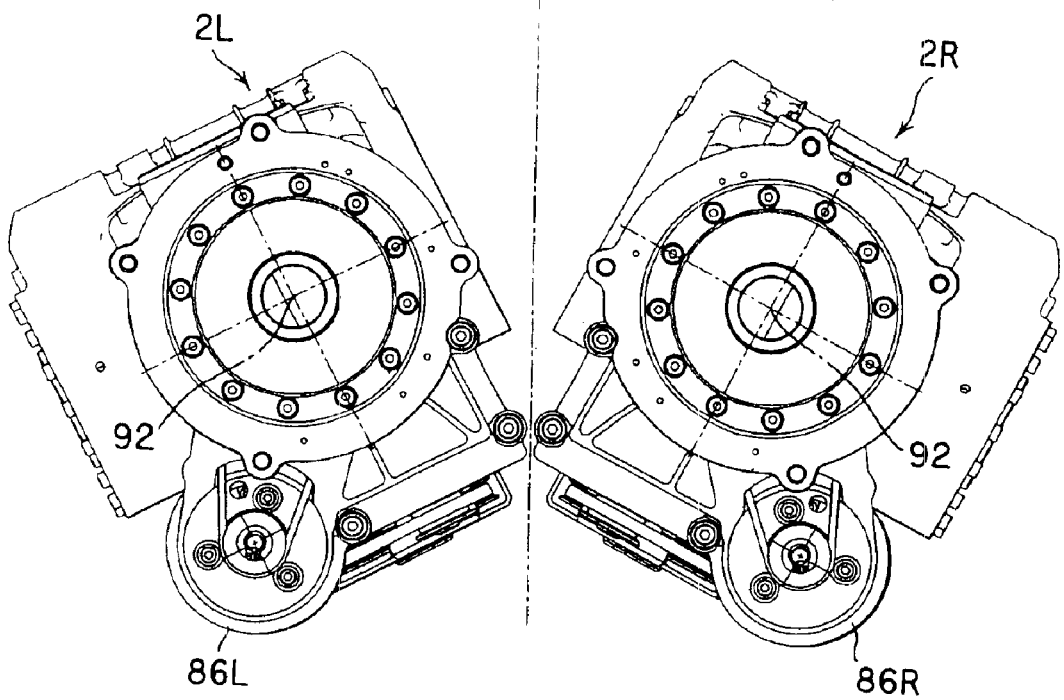

In order to facilitate swing operation of the robot 1 so as to expand the degree of freedom of gait design, it is necessary to configure the joints 10R(L) so that the legs 2R(L) and the unshown feet 22R(L) can be rotated from the state shown in FIG. 10(a) to a desired angle as shown in FIG. 10(b).

Therefore, as set out in the foregoing, in this embodiment the electric motors 88 are disposed with an offset from the rotation axes 92 of the joints 10R(L). More specifically, the electric motors 88 are disposed on the outsides of the legs 2R(L) to the rear relative to the direction of advance (X-axis direction) and are connected to the joints 10R(L) through the belt 90 power transmission means.

By this, as shown in FIG. 10(b), the legs 2R(L) can be rotated to desired angles without the left and right legs 2R(L) interfering with each other, whereby the aforesaid object can be accomplished.

Figure 11:
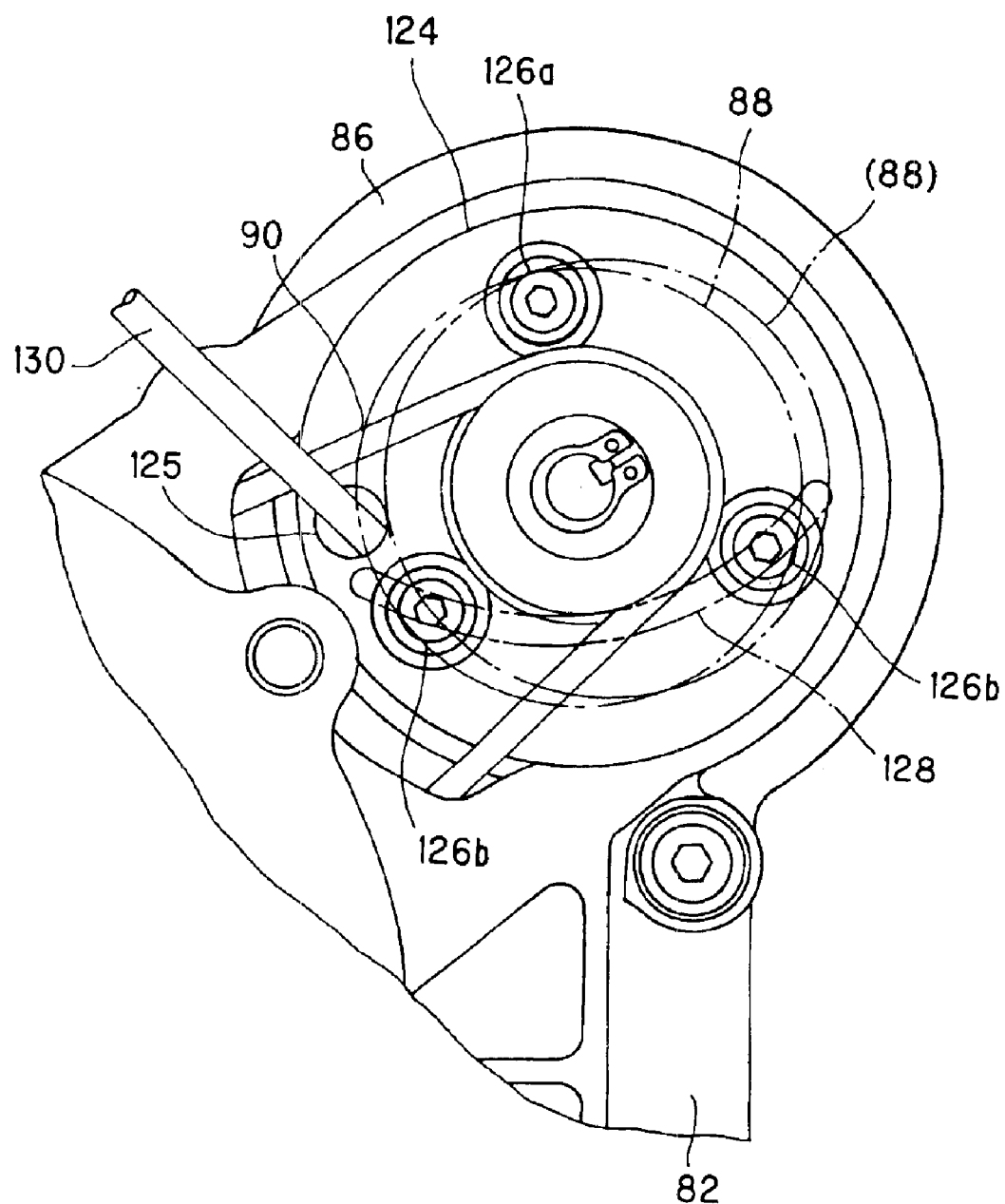
FIG. 11 is a partial enlarged view of the part designated by symbol XI in FIG. 6.

Returning again to the explanation of FIG. 6, explanation will be made with reference to FIGS. 11 and 12 regarding adjustment of the tension of the belts 90 for transmitting drive force from the electric motors 88 to the Harmonic Drives 84.

The tension of the belts 90 may decrease owing to aging, and in such case slipping arises between the pulleys 96 and the wave generators 100. Since the electric motor 88 on each side is equipped with one of the rotary encoders 89, controllability is liable to be degraded when such slipping occurs because there occurs not only a decrease in transmitted power but also an error between the command value to the electric motor 88 and the number of revolutions actually input to the wave generator 100.

The motor attachment member 86 covering the electric motor 88 is formed with an opening (opening part) 124 at a location facing the body 3. More specifically, as shown in FIG. 11, which is a partial enlarged view of the vicinity of the part designated by symbol XI in FIG. 6, the motor attachment member 86 is formed at a location facing the body 3 with the opening 124 and is further perforated with an adjustment tool insertion hole (opening part) 125 for positional adjustment of the electric motor 88.

The electric motor 88 is secured on the upper side of the motor attachment member 86 by bolts 126a, 126b. Actually, a cover (not shown) is attached over the opening 124 and is made openable/closable when conducting adjustment of the belt 90.

Here the bolt 126a is inserted into an unshown securement hole and the bolts 126b are constituted to be capable of being movable along a groove part 128 indicated by a phantom line. Thus, when the tension of the belt 90 is to be adjusted, the bolts 126a, 126b are first loosened, an adjustment tool such as a screwdriver 130, for instance, is then inserted into the adjustment tool insertion hole 125, and the position of the electric motor 88 is shifted. The electric motor 88 is rotated using the axis securing the bolt 126a as a pivot (center axis) to shift it to, for example, the position indicated as (88), thereby adjusting the tension of the belt 90.

Figure 12:
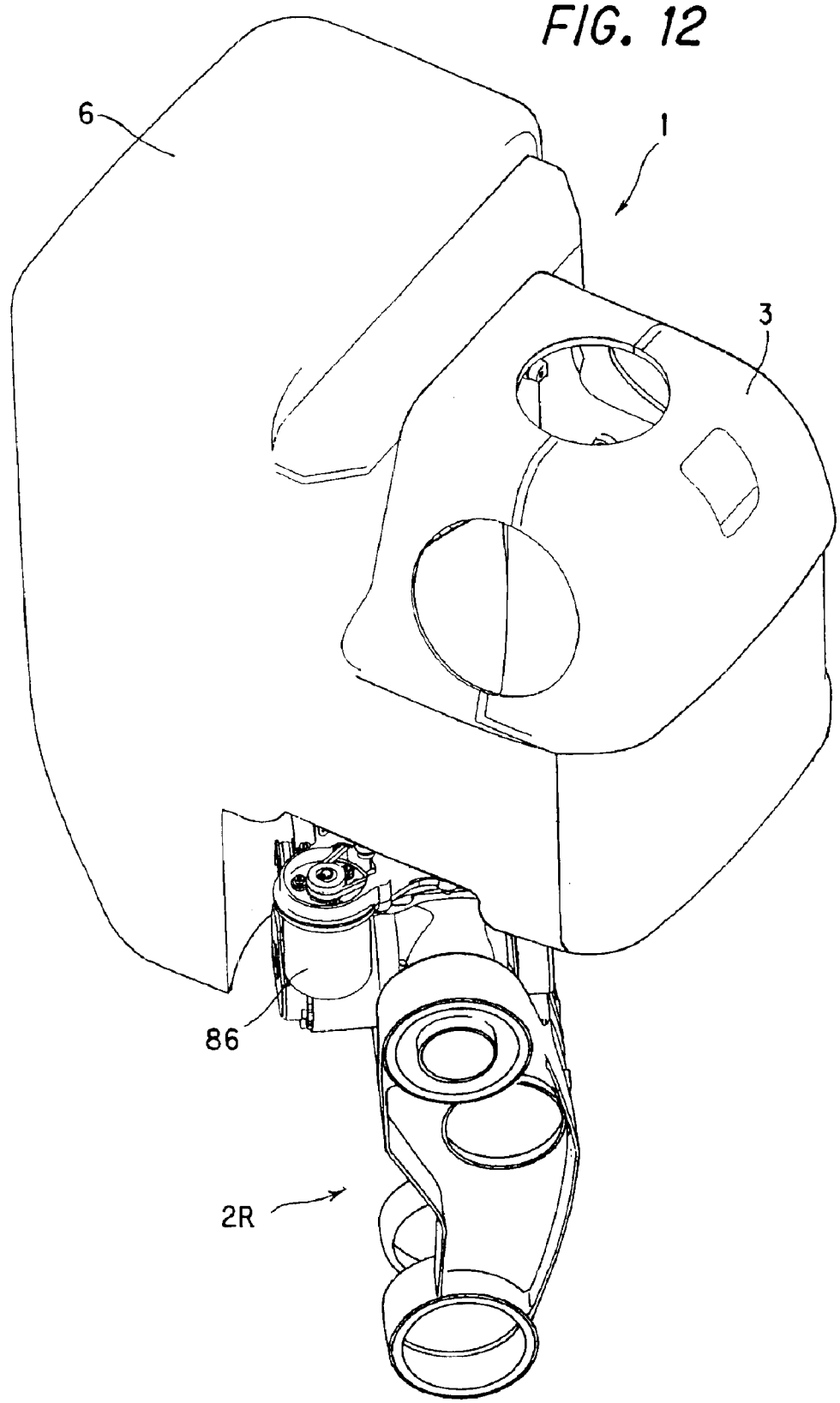
FIG. 12 is a perspective view for explaining the positional relationship between the robot body and a leg when adjusting the tension of a belt (power transmission means).

Since the openings 124 are formed at locations facing the body 3, the belts 90 can be accessed and their tension adjusted by rotating the legs 2 (only R shown) to a position such as shown in FIG. 12, without attaching/detaching the legs 2R(L) to/from the body 3.

As set out in the foregoing, in the robot 1 according to this embodiment, since the electric motor 88 is disposed on the on the leg 2R(L) side, the leg 2R(L) can be easily attached/detached to/from the body 3. Thus in the case of adjusting a leg, the ease of maintenance of the leg 2R(L) of the legged robot 1 is improved.

Further, since electric motor 88 is offset from the rotation axis 92 of the joints 10R(L), more specifically, is disposed at the rear of the outer side relative to the direction of robot advance (X-axis direction) and is connected to the joint 10R(L) through the belt 90, the leg 2R(L) can be rotated to a desired angle, and swing operation and the like are made easy, thereby expanding the degree of freedom in gait design.

In addition, since the motor attachment member 86 covering the electric motor 88 is perforated at a location facing the body with the opening 124, the tension of the belt 90 can be adjusted without removing a pelvic plate 110 from the body 3, i.e., with the robot 1 in an upright state or in a state fixed on a stand (not shown).

As set out in the foregoing, in this embodiment, in a legged robot 1 having at least a body 3 and a plurality of legs 2R(L) each connected rotatably to the body through a joint 10R(L), a drive sources (electric motors 88) for driving the joint is disposed on each leg.

Further, the robot 1 is configured such that, the drive source is disposed with an offset from a rotation axis 92 of the joint and is connected to the joint through power transmission means (belt 90).

Further, the legged robot is configured such that, the drive source is covered with a case (motor attachment members 86) and the case is perforated with an opening (openings 124, adjustment tool insertion holes 125) at a location where the case faces the body.

Further, in a biped robot having at least a body 3 and two legs 2 each connected rotatably to the body through a joint 10R(L), characterized in that: a drive source (electric motors 88) for driving the joint is disposed at an outer side of each leg with an offset from a rotation axis 92 of the joint, thereby preventing interference during relative displacement of the two legs (FIG. 10(*b*)).

Although the hip joints for leg swiveling were defined as joints around the vertical axis (Z axis or gravity axis), they are not limited to such, and the essential feature is that, in the joints connecting the body and the legs, insofar as the configuration disposes the drive sources on the leg side, they may, for example, be joints whose rotation center axes are inclined relative to the vertical axis.

Although belts and pulleys are used as the power transmission means in the present invention, other transmissions means such as gear mechanisms or the like may instead be used.

Although the present invention has been explained with regard to a biped robot, it is also appropriate for mutltilegged robots other than biped.

Industrial Applicability

In accordance with the present invention, attachment/detachment of the legs from the body of a robot is facilitated to enhance the ease of maintenance of the legs of a legged robot. Further, the legs can be rotated to a desired angle to facilitate swing operation, thereby expanding the degree of freedom of gait design. Further, the belt and other transmission means for driving the joints that connect the body and legs can be easily accessed, which likewise enhances maintenance ease. In addition, the legs can be rotated to desired angles to facilitate swing operation and the like and expand the degree of freedom of gait design.

What is claimed is:

1. A legged robot having at least a body and a plurality of legs each connected rotatably to the body through a joint, the legged robot comprising:

a drive source for driving the joint, said drive source being disposed on a leg, and offset from a center axis of the joint; and rotating means for rotating said drive source at an angle from said center axis.

2. A legged robot according to claim 1, wherein the drive source is connected to the joint through power transmission means.

3. A legged robot according to claim 1, wherein the drive source is covered with a case and the case is performed with an opening at a location where the case faces the body.

4. A biped robot having at least a body and two legs each connected rotatably to the body through a joint, the biped robot comprising:

a drive source for driving the joint, said drive source being disposed at an outer side of a leg with an offset from a rotation axis of the joint, thereby preventing interference during relative displacement of the two legs; and rotation means for rotating said drive source to prevent said interference.

5. A legged robot apparatus, comprising:

first means disposed with an offset from a center axis of a joint on at least one leg, said first means for driving said at least one leg; and second means for rotating said first means at an angle from said center axis, wherein said first means does not create an interference for said leg.

\* \* \* \* \*